Sept. 17, 1940.  F. M. CLARK  2,214,876
METHOD OF FABRICATING ELECTROLYTIC CAPACITOR Filed April 14, 1936

Inventor:
Frank M. Clark,
by Harry E. Dunham
His Attorney.

Patented Sept. 17, 1940

2,214,876

UNITED STATES PATENT OFFICE 2,214,876

METHOD OF FABRICATING ELECTROLYTIC CAPACITOR

Frank M. Clark, Pittsfield, Mass., assignor to General Electric Company, a corporation of New York Application April 14, 1936, Serial No. 74,310

4 Claims. (Cl. 204—1)

The present invention relates to method of fabricating electric capacitors and its object is to improve their efficiency and reliability.

Heretofore capacitors (or condensers) of the electrolytic type have been prepared by subjecting film-forming armatures to suitable electrolytic treatment to form a current-blocking film, assembling the filmed armatures with interposed porous spacers in proper relation and impregnating the assembly with an electrolyte.

As a consequence of my present invention, a structure is provided whereby the cubical volume or bulk of electrolytic capacitors can be reduced, their manufacture simplified and their efficiency improved by forming on one or both of the armatures a composite film which renders the presence of a porous spacer unnecessary.

In accordance with my invention aluminum foil, (or sheets or foil of other material suitable for use as armature element), has formed upon its surface a composite coating made up of a current-blocking film and an electro-permeable resin film, both films being the result of electrolytic action. The resin film, which may consist of shellac, is first deposited and the current-blocking film is formed under the resin film. The novel features of my invention will be set forth in greater particularity by the appended claims.

Figure 1:
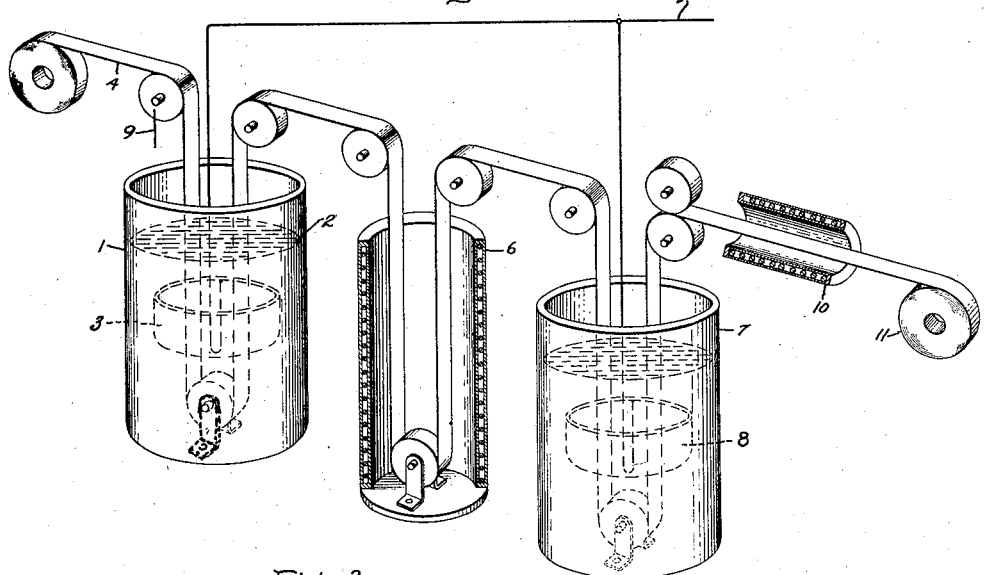
Figure 2:
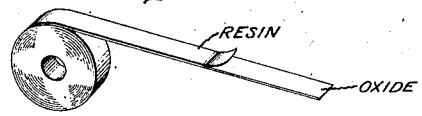
Figure 3:
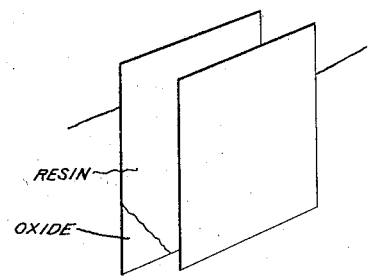

In the accompanying drawing, Fig. 1 is a diagram indicating the sequence of steps of the process feature of my invention. Fig. 2 illustrates an armature element and Fig. 3 illustrates conventionally a capacitor embodying my invention.

As indicated by Fig. 1 an elongated foil of film-forming metal, such as aluminum, tantalum, magnesium, or suitable alloy, is conducted into an electrolyte consisting of a suitable resin-depositing electrolyte, and a coating of resin is electrodeposited thereon. Such electrolyte may be made by dispersing an alkali-soluble resin in water containing a suitable alkali. I may employ shellac (which is of insect origin) or a tree resin, such as rosin, mastic, anime, dammar, sandarac, or dragon's blood or a fossil resin, such as, amber or kauri. Various alkaline solutions may be used, such, for example, as an hydroxide or borate or carbonate of sodium, potassium or ammonium, or mixtures of such alkali compounds.

For example, about 100 grams of shellac may be introduced into about 500 cubic centimeters of water which contains dissolved about 5 grams of alkaline material of the kind above specified, preferably sodium carbonate. The material used should be free from chlorides. The mixture is boiled for about an hour, resulting in complete solution of the shellac. It is probable that such "solution" involves chemical reaction involving hydrolysis of the shellac. When the alkaline material is represented by a borate (such as the tetraborate of sodium or ammonium) then a few per cent (about 10 cubic centimeters) of concentrated ammonium hydroxide is added, preferably after boiling has been carried out for about an hour. Boiling is continued thereafter for about fifteen minutes to secure complete solution and the elimination of excess ammonia. The solution thus obtained is ready for use in capacitors.

In some cases a plasticizer or flexibilizer may be added such as a soap or rubber latex.

As shown in Fig. 1 of the drawing, an elongated strip of aluminum foil is treated in successive steps to produce the composite coating. The foil 4 is first conducted through a receptacle 1 containing a solution of resin 2 as, for example, the shellac solution above described, which may be maintained at a temperature of 35 to 45° C. The container is provided with a cathode 3. A suitable direct current supplied by the conductor 9, 9' is impressed between the foil 4 acting as anode and the cathode 3. A potential of 160 volts is suitable for the deposition of a shellac film on the foil when passing through the electrolyte solution 2 at such rate that the foil is immersed in the shellac solution for about one minute although the exact immersion time is not critical. For example the foil may move at a rate of four feet per minute with an immersion of three feet in the solution, thereby giving an immersion time of three-quarters of a minute in the solution.

The foil continues in its progress from the container 1 to an oven 6 in which it is baked at about 100 to 200° C. from about one to two minutes. The electrical conductivity of the film is not lost by this short bake. It then passes into a container 7 through an aqueous electrolyte which is suitable for producing a current-blocking film of oxygenous material on the aluminum. Such an electrolyte may consist of a solution of borax and boric acid in water as described in U. S. Patent No. 2,022,500 issued to Clark and Koenig. The electrolyte may be maintained at about 95° C. The voltage for this anodic treatment will vary with the voltage to be applied on the completed capacitor. I prefer to use a voltage equal to or slightly greater than the maximum direct current or peak alternating current voltage to which the capacitor will be normally subjected. Thus, for 110 volts alternating current application, a direct current voltage of about 160 volts may be employed for the electrolytic treatment. The foil as before acts as anode, a separate electrode 8 being employed as cathode. The resin film being applied to the foil prior to the electrolytic treatment, the electrolysis occurs under the resin film resulting in a current-blocking film of oxide as though the resin film were not present.

The coated foil is dried by passing through a second oven 10 which is maintained at a temperature of about 100 to 200° C., heat being applied again for about one to two minutes. Too high a temperature or too long a period of baking will result in the film becoming impermeable to electrolyte and passage of current. The coated and formed product is finally coiled upon a reel 11 and is ready for use.

Two coated layers of foil may be placed in juxtaposition to form the elements of a capacitor as shown conventionally in Fig. 3 without the interposition of any porous spacer, it being understood that the capacitor elements may be assembled in any desired way, that is, either by stacking or by coiling, as well understood. The voids in the capacitor assembly may be impregnated or filled with any suitable electrolyte. A number of available electrolyte compositions are described in the above-mentioned Patent No. 2,022,500. Other known electrolyte compositions may be employed. After impregnation the capacitor assembly is placed in a receptacle which is provided with suitable terminals as well understood.

Capacitors so prepared for 110 volt alternating current circuits show power factors of less than 10 per cent and capacity of approximately one microfarad for 8½ square inches of active foil area. In respect to these and other characteristics, including length of operating life and reliability, capacitors embodying the present invention compare favorably with capacitors containing paper spacers between the electrodes. A decided advantage, however, is obtained by the fact that due to the decreased thickness of the resin films as compared with the equivalent paper spacers, the size of units of given capacity is materially reduced.

In a divisional application, Serial No. 241,223, filed November 18, 1938, claims are made on the product resulting from the process herein claimed.

What I claim as new and desire to secure by Letters Patent of the United States is:

1. The method of treating a capacitor armature consisting of film-forming metal which consists in electro-depositing on said armature an electropermeable resinous film from a dispersion of an alkali-soluble resin in an alkaline aqueous electrolyte and thereupon subjecting the armature so-coated to anodic treatment in an aqueous electrolyte to form a current-blocking film of oxygenous material on said metal under said resinous film.

2. The method of treating a capacitor armature consisting of film-forming metal which consists in electro-depositing on said armature an electropermeable resin film from a dispersion of an alkali-soluble resin in an alkaline aqueous electrolyte, heat-treating said film without rendering the film impermeable to electrolyte and thereupon subjecting the armature provided with such film to further anodic treatment in an aqueous electrolyte to form a current-blocking film of oxygenous material under said resin film.

3. The method of treating a capacitor armature consisting of aluminum which consists in electro-depositing on said aluminum armature a resinous film from an aqueous electrolyte containing the reaction product of shellac and an alkali, baking said resinous film at a temperature of 100 to 200° C. for a length of time too short to render the same impermeable by electrolyte and thereupon subjecting said armature to electrolysis in an aqueous solution of an inorganic salt to form a current-blocking film of oxygenous material under said resinous film.

4. The method of treating a capacitor armature consisting of aluminum which consists in electrodepositing thereon a resinous film from an aqueous electrolyte containing the reaction product of shellac and an alkali, subjecting said film to a temperature of about 100 to 200° C. for about one to two minutes, forming a current-blocking film of oxygenous material under said resin film anodically in an electrolyte and again subjecting said film to a second heat treatment under substantially the same conditions.

FRANK M. CLARK.